UNITED STATES PATENT OFFICE.

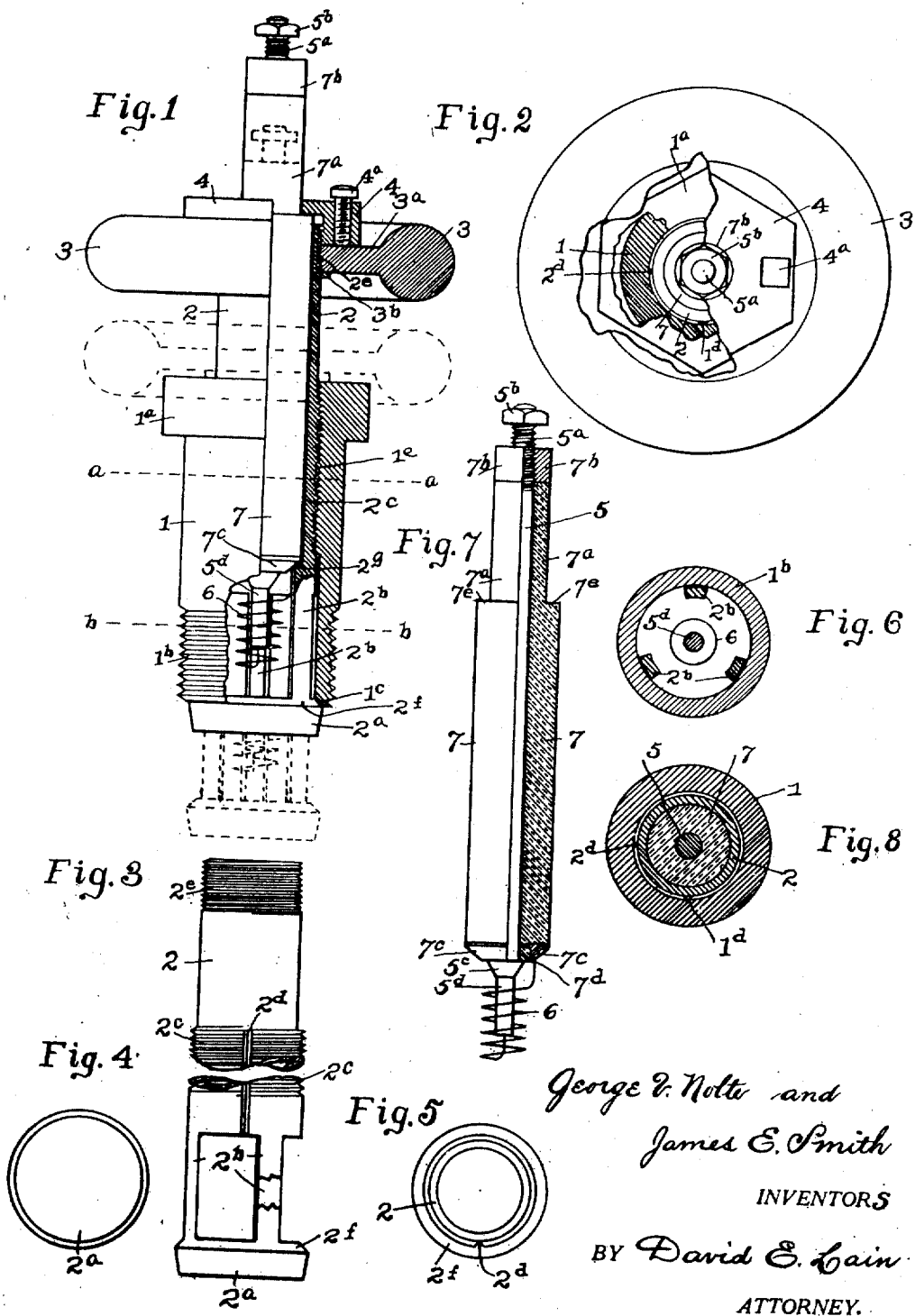

GEORGE V. NOLTE AND JAMES E. SMITH, OF BELLINGHAM, WASHINGTON.

SPARK-PLUG.

1,249,465.

Specification of Letters Patent.  Patented Dec. 11, 1917.

Application filed September 6, 1917. Serial No. 189,944.

*To all whom it may concern:*

Be it known that we, GEORGE V. NOLTE and JAMES E. SMITH, citizens of the United States, and residents of Bellingham, in the county of Whatcom and State of Washington, have invented certain new and useful Improvements in Spark-Plugs, of which the following is a specification.

Our invention relates to improvements in ignition plugs for use in, so called, semi-Diesel, interior-combustion engines which require the services of an ignition plug only at short and infrequent intervals; and the objects of our invention are: first, to provide an ignition plug the element of which, when desired, can be shielded from the injurious action of the violently moving gases in the cylinder; second, which can readily be removed and replaced during the normal operations of the engine; and third, which is so constructed that its engaged, threaded parts, which are exposed to carbonization, will free themselves during their operation.

We attain these objects by the mechanism illustrated in the accompanying drawing, in which—

Figure 1 is an elevation view of the complete plug; Fig. 2 is a plan view of Fig. 1; Fig. 3 is an elevation view of the cage and valve having its central part broken away; Fig. 4 is a bottom plan view of Fig. 3; Fig. 5 is a top plan view of Fig. 3; Fig. 6 is a sectional view of Fig. 1 on the line $b$—$b$; Fig. 7 is an elevation view of the electrode; and Fig. 8 is a sectional view of Fig. 1 on the line $a$—$a$.

Similar characters of reference relate to similar parts in the several views.

Certain parts are broken away in order to show other parts hidden thereby.

The hollow stud 1 has a threaded lower end $1^b$ for engagement w..h a tapped hole properly located in the cylinder—not shown, a hexagonal head $1^a$ for engagement with a wrench, and a valve seat $1^c$ on its lower end. Cage $2^b$, $2^c$ has a hollow cylindrical shank 2, of smaller diameter than the main body $2^e$, which is threaded on its upper part and has its lower end closed at $2^a$, said bottom $2^a$ being connected to the main body by three pillars $2^b$, $2^b$, $2^b$ leaving three openings between the same. The upper periphery $2^f$ of $2^a$ is finished to form a valve suited for valve seat $1^c$. Handwheel 3 has a tapped central hole to engage with threaded body $2^e$ on the upper end of cage $2^b$, $2^c$. Electrode 5 has its upper end $5^a$ threaded. On this threaded end a binding nut $5^b$ and also a cylindrical nut $7^b$ are engaged. Between nut $7^b$ and a circular boss $5^c$, near the lower end of the electrode, is clamped the insulating covering comprising the main cylindrical body 7, the smaller cylindrical body $7^a$ above and the bushing $7^d$ at the lower end. A beveled, metallic washer $7^c$ is retained on the lower end of said insulating body by said bushing $7^d$. Washer $7^c$ serves as a valve and is finished to make a closure on valve seat $2^g$ in cage $2^b$, $2^c$. A resilient, heat resistant ring $3^b$ on the cage shank 2 beneath hand wheel 3 is placed to bear on the top of $1^a$ when cage $2^b$, $2^c$ is extended to its dotted position. The lower end $5^d$ of electrode 5 is encircled with helical element 6 one end of which is electrically connected to the lower end of $5^d$ and the upper end of which is electrically connected to metallic washer $7^c$. Said element establishes electrical connection between electrode 5 and stud 1 when washer $7^c$ is seated on $2^g$. Nut 4 is suited to bear on the shoulder between 7 and $7^a$ and engage with threaded body $2^e$ to cause $7^c$ to bear on $2^g$, and retain the electrode in operative position in cage $2^b$, $2^c$. Set screw $4^a$ serves to retain nut 4 in operative position. On the outside of cage $2^b$, $2^c$ extending longitudinally across the threads of $2^e$ and as far as one of the openings through the walls of said cage is groove $2^d$ as deep as said threads. On the inside of stud 1 is longitudinal groove $1^d$ extending entirely across the threads therein and being as deep as said threads. Grooves $1^d$ and $2^d$ are relatively so located that they do not register when valve $2^a$ is seated, see Figs. 3 and 8.

In describing the operation of our improved plug, it is assumed that stud 1 is properly attached to the engine cylinder and that one terminal of a suitable source of electricity is connected to electrode 5 by clamping under nut $5^b$ and the other terminal of said source of electricity is electrically connected to some part of the engine frame as usual. Element 6 will be made red hot by the electric current from said source of electricity. Hand wheel 3 is revolved to take it to its dotted-line position in Fig. 1. This causes cage $2^b$, $2^c$ to occupy its protracted position shown in dotted lines in said figure, where hot element 6 is exposed to the gaseous contents of the engine cylinder through the cage openings between pillars $2^b$, $2^b$, $2^b$ and will cause the same to explode as usual. Ordinarily the services of an ignition plug are not needed except in starting engines of the above type. After the engine is satisfactorily in operation, hand wheel 3 is revolved to take it back to its full line position in Fig. 1 which retracts cage $2^b$, $2^c$ to its full-line position where valve $2^a$ is seated on $1^c$ and element 6 is completely shut off from contact with the violently agitated and heated gases in the cylinder. The electric current through said element can now be discontinued by opening the switch usually supplied for that purpose and said element is allowed to rest until its services are again required to ignite the cylinder gases when it is again protracted as before. To remove the electrode and element for examination, repair or replacement during the operation of the engine: set screw $4^a$ is loosened, and nut 4 is unscrewed when said electrode and element can be removed while valve $2^a$ effects a closure between the cage's interior and the engine cylinder.

While the cage is protracted, engaged threaded bodies $1^c$ and $2^c$ are exposed to the cementing influence of the carbon-bearing gases which may intrude. To prevent the setting together of these threaded surfaces grooves $1^d$ and $2^d$ are provided. When said cage is turned, deposits of carbon on said threads are scraped off and enter said grooves from where they are expelled by the pressure within the engine cylinder whenever said grooves register in passing.

Protection of the ignition element from the injurious effects of exposure to the operative conditions within the cylinder during long periods of time is thus easily accomplished by our construction. Furthermore the convenient means of removing and replacing said element during engine operation is not only important when operating engines of the semi-Diesel type but will be found very useful during the operation of multi-cylinder gasolene engines. Therefore, we do not limit ourselves to the exclusive application of our invention to semi-Diesel engines.

Having thus fully described our invention, what we claim as new and desire to secure by Letters Patent is—

1. In combination, the cylinder of an internal-combustion engine, a protractile and retractile electrode cage attached thereto, an electrode retained within said cage, and an ignition element electrically connected to said electrode within said cage.

2. In combination, the cylinder of an internal-combustion engine, a protractile and retractile cage attached thereto, an electrode retained within said cage, an ignition element electrically connected to said electrode within said cage, and means to seal the interior of said cage from communication with the interior of said engine cylinder.

3. In combination, the cylinder of an internal-combustion engine, a protractile and retractile electrode cage attached thereto, an electrode retained within said cage, an ignition element electrically connected to said electrode within said cage, means to seal the interior of said cage from communication with the interior of said engine cylinder, and means to remove and replace said electrode with said element without breaking said seal.

4. In combination, the cylinder of an internal-combustion engine; a hollow, cylindrical, threaded stud, having a valve seat on its inner end, engaged with said engine cylinder; a hollow, cylindrical, perforated cage, having a closed inner end, engaged within said stud in screw relation therewith, said closed end fitted to seat on said valve seat; an insulated electrode within said cage; and an ignition element electrically connected to said electrode within the perforated part of said cage.

5. In combination, the cylinder of an internal-combustion engine; a hollow, cylindrical stud in screw engagement with said engine cylinder, having an interior threaded body intersected with a longitudinal groove; and a hollow, cylindrical, perforated cage, having a threaded outer body in screw engagement with the interior threaded body of said stud, said threaded outer body having a longitudinal groove intersecting the threads of the same.

Signed at Bellingham in the county of Whatcom and State of Washington this 31st day of August A. D. 1917.

GEORGE V. NOLTE.
JAMES E. SMITH.

Witness:
P. S. SIMPSON.